(12) United States Patent
Leppinen

(10) Patent No.: US 8,806,326 B1
(45) Date of Patent: Aug. 12, 2014

(54) USER PREFERENCE BASED CONTENT LINKING

(75) Inventor: Mika Leppinen, Woburn, MA (US)

(73) Assignee: Nokia Inc., Irving, TX (US)

( * ) Notice: Subject to any disclaimer, the term of this patent is extended or adjusted under 35 U.S.C. 154(b) by 990 days.

(21) Appl. No.: 09/669,045

(22) Filed: Sep. 25, 2000

(51) Int. Cl.
*G06F 17/22* (2006.01)
*G06F 15/16* (2006.01)

(52) U.S. Cl.
USPC .......... 715/234; 715/205; 715/249; 715/256; 709/203; 709/217; 704/5; 704/277

(58) Field of Classification Search
USPC .......... 715/500.1, 501.1, 517, 530, 516, 523, 715/501, 511, 513, 526, 200–202, 205, 231, 715/234, 238, 249, 255–256, 273, 700, 734, 715/744, 760, 762; 709/224, 206, 203, 219, 709/228; 707/10; 415/414.2, 414, 414.4
See application file for complete search history.

(56) References Cited

U.S. PATENT DOCUMENTS

| | | | | |
|---|---|---|---|---|
| 5,572,643 A * | 11/1996 | Judson | ........................... | 709/218 |
| 5,848,415 A * | 12/1998 | Guck | ........................... | 707/831 |
| 5,918,013 A * | 6/1999 | Mighdoll et al. | ............. | 709/217 |
| 5,944,790 A * | 8/1999 | Levy | ........................... | 709/218 |
| 5,966,652 A * | 10/1999 | Coad et al. | ................. | 455/412.1 |
| 6,026,417 A * | 2/2000 | Ross et al. | ..................... | 715/517 |
| 6,076,077 A * | 6/2000 | Saito | ............................... | 705/51 |
| 6,112,192 A * | 8/2000 | Capek | ............................. | 705/59 |
| 6,119,078 A * | 9/2000 | Kobayakawa et al. | ............ | 704/3 |
| 6,122,649 A * | 9/2000 | Kanerva et al. | ................ | 715/516 |
| 6,128,635 A * | 10/2000 | Ikeno | ............................. | 715/246 |
| 6,161,082 A * | 12/2000 | Goldberg et al. | ................. | 704/3 |
| 6,185,598 B1 * | 2/2001 | Farber et al. | .................. | 709/200 |
| 6,226,642 B1 * | 5/2001 | Beranek et al. | ................. | 707/10 |
| 6,240,414 B1 * | 5/2001 | Beizer et al. | ....................... | 707/8 |
| 6,247,048 B1 * | 6/2001 | Greer et al. | .................... | 709/219 |
| 6,311,185 B1 * | 10/2001 | Markowitz et al. | ......... | 705/14.49 |
| 6,321,257 B1 * | 11/2001 | Kotola et al. | ................. | 709/219 |
| 6,332,157 B1 * | 12/2001 | Mighdoll et al. | ............. | 709/217 |
| 6,336,137 B1 * | 1/2002 | Lee et al. | ....................... | 709/219 |
| 6,353,839 B1 * | 3/2002 | King et al. | .................... | 715/236 |
| 6,356,529 B1 * | 3/2002 | Zarom | ........................... | 370/231 |
| 6,385,586 B1 * | 5/2002 | Dietz | ............................. | 704/277 |

(Continued)

FOREIGN PATENT DOCUMENTS

WO   WO 99/40514   * 2/1999
WO   WO 00/76172 A1 * 12/2000

OTHER PUBLICATIONS

Kawachiya et al., "VideoProxy: A Media and Protocol Converter for Internet Video," Global Information Infrastructure Evolution, Oct. 1996, pp. 541-550.*

(Continued)

*Primary Examiner* — Maikhanh Nguyen
(74) *Attorney, Agent, or Firm* — Ditthavong & Steiner, P.C.

(57) ABSTRACT

A method and apparatus for user selectable content linking in internet applications. The usability of downloaded content may be modified for specific users by allowing a user to select the content in which and how their content data is linked. Particular text may be selected, and when content is downloaded from an origin service including the particular text, the text may be automatically linked to a service or database. The service or database is independent of the origin service and may be provided by a third party.

31 Claims, 5 Drawing Sheets

(56) References Cited

U.S. PATENT DOCUMENTS

| | | | |
|---|---|---|---|
| 6,412,008 B1* | 6/2002 | Fields et al. | 709/228 |
| 6,418,439 B1* | 7/2002 | Papierniak et al. | 707/9 |
| 6,430,409 B1* | 8/2002 | Rossmann | 455/422.1 |
| 6,430,624 B1* | 8/2002 | Jamtgaard et al. | 709/246 |
| 6,438,575 B1* | 8/2002 | Khan et al. | 709/200 |
| 6,457,030 B1* | 9/2002 | Adams et al. | 715/239 |
| 6,473,609 B1* | 10/2002 | Schwartz et al. | 455/406 |
| 6,477,575 B1* | 11/2002 | Koeppel et al. | 709/224 |
| 6,519,241 B1* | 2/2003 | Theimer | 370/338 |
| 6,532,465 B2* | 3/2003 | Hartley et al. | 707/10 |
| 6,535,896 B2* | 3/2003 | Britton et al. | 715/239 |
| 6,538,673 B1* | 3/2003 | Maslov | 345/853 |
| 6,553,240 B1* | 4/2003 | Dervarics | 455/566 |
| 6,556,217 B1* | 4/2003 | Makipaa et al. | 345/667 |
| 6,560,616 B1* | 5/2003 | Garber | 707/203 |
| 6,598,015 B1* | 7/2003 | Peterson et al. | 704/3 |
| 6,604,101 B1* | 8/2003 | Chan et al. | 707/706 |
| 6,605,120 B1* | 8/2003 | Fields et al. | 715/513 |
| 6,615,212 B1* | 9/2003 | Dutta et al. | 1/1 |
| 6,623,529 B1* | 9/2003 | Lakritz | 715/205 |
| 6,674,453 B1* | 1/2004 | Schilit et al. | 715/810 |
| 6,678,518 B2* | 1/2004 | Eerola | 455/422.1 |
| 6,704,798 B1* | 3/2004 | Mogul | 709/246 |
| 6,731,945 B2* | 5/2004 | Do et al. | 455/463 |
| 6,822,663 B2* | 11/2004 | Wang et al. | 715/854 |
| 6,826,597 B1* | 11/2004 | Lonnroth et al. | 709/207 |
| 6,857,102 B1* | 2/2005 | Bickmore et al. | 715/205 |
| 6,865,171 B1* | 3/2005 | Nilsson | 370/338 |
| 6,865,716 B1* | 3/2005 | Thurston | 704/9 |
| 6,925,595 B1* | 8/2005 | Whitledge et al. | 715/234 |
| 6,937,588 B2* | 8/2005 | Park | 370/338 |
| 6,950,881 B1* | 9/2005 | Ndili | 709/246 |
| 6,952,578 B1* | 10/2005 | Pedersen et al. | 455/414.2 |
| 6,993,476 B1* | 1/2006 | Dutta et al. | 704/9 |
| 7,025,209 B2* | 4/2006 | Hawkins | 209/217 |
| 7,058,626 B1* | 6/2006 | Pan et al. | 1/1 |
| 7,149,681 B2* | 12/2006 | Hu et al. | 704/2 |
| 7,389,221 B1* | 6/2008 | Pearson et al. | 704/2 |
| 7,590,681 B1* | 9/2009 | Chang et al. | 709/203 |
| 7,685,252 B1* | 3/2010 | Maes et al. | 709/217 |
| 2001/0037404 A1* | 11/2001 | Hafsteinsson et al. | 709/246 |
| 2002/0016801 A1* | 2/2002 | Reiley et al. | 707/523 |
| 2002/0054090 A1* | 5/2002 | Silva et al. | 345/747 |
| 2002/0161928 A1* | 10/2002 | Ndili | 709/246 |

OTHER PUBLICATIONS

Kaasinen et al., "Two approaches to bringing Internet Service to WAP devices," Computer Networks, Jun. 2000, pp. 231-246.*

"Wireless Application Protocol Architecture Specification," WAP Architecture Version Apr. 30, 1998, Apr. 1999, pp. 1-20.*

R. Han et al., "Dynamic Adaptation in an Image Transcoding Proxy for Mobile Web Browsing," IEEE Personal Communications, XP000790121, Dec. 1998, pp. 8-17.*

R. Khare, "W * Effect Considered Harmful," 4K Associates, Apr. 1999, pp. 1-30.*

"WAP White Paper," AU-System Radio, Feb. 1999, pp. 1-22.*

R. Sietmann, "Mobil Ins Internet—Wireless Application Protocol Adaptiert Mobiltelefone Fuer Das WWWW", XP000732823, 1998, pp. 202-207.*

N. Leavitt, "Will WAP Deliver the Wireless Internet?", Technology News, May 2000, pp. 16-20.*

Luotonen, A., "Web Proxy Servers", © 1998 Netscape Communications Corp., pp. 1-15, 213-225, 272-273, 286-290, 292-294.

"Wireless Application Group User Agent Profile Specification", WAG UAPROF Version Nov. 10, 1999, © Wireless Application Protocol Forum, Ltd. 1999, 76 pgs.

* cited by examiner

"NOKIA (NOK) IS PROVIDING FULL WAP SOLUTIONS"

FIG.5a

"NOKIA (NOK, $xxx,+y) IS PROVIDING FULL WAP SOLUTIONS"

FIG.5b

"NOKIA (NOK) IS PROVIDING FULL WAP SOLUTIONS"

FIG.5c

"JOHN SMITH IS THE MANAGER OF PROJECT X"

FIG.6a

"JOHN SMITH IS THE MANAGER OF PROJECT X"

FIG.6b

"WAP PUHELIN ON UUTUUS"

FIG.7a

"WAP PUHELIN ON UUTUUS"

FIG.7b

USER PREFERENCE BASED CONTENT LINKING

FIELD OF THE INVENTION

The present invention relates to information presentation and retrieval in wireless and internet applications, and more particularly with a method and apparatus for providing user selectable automatic content linking in internet applications.

BACKGROUND OF THE INVENTION

A user of the Internet typically accesses and uses the Internet by establishing a network connection through the services of an Internet Service Provider (ISP). An ISP provides computer users with the ability to establish a connection to a remote computer owned or managed by the ISP. This remote computer then makes services available to the users Internet access device. These services include the retrieval and display of WEB pages and electronic documents on the users Internet access device. Electronic documents on the World-Wide-Web are typically stored in files that include text, hypertext, references to graphics, animation, audio, video and other electronic data. The structure of hypertext documents is defined by document markup languages such as Standard Generalized Markup Language ("SGML"), Hyper Text Markup Language ("HTML"), Compact Hyper Text Markup Language, eXtensible Markup Language ("XML"), Virtual Reality Markup Language ("VRML"), Voice eXtensible Markup Language, ("VoxML") and others.

As is known in the art, a hypertext document includes markup codes called "tags". Tags define the structure of a hypertext document and typically include at least a "begin" tag name enclosed by a delimiter and, in many instances, an "end" tag name enclosed by a delimiter. For example, the markup tag "<H1>" signifies the beginning of a Hyper Text Markup Language first level header, and the markup tag "</H1>" signifies the end of a Hyper Text Markup Language first level header. However, the Hyper Text Markup Language image tag "<IMG . . . >" ends with the closing tag delimiter ">" and does not use an end tag in the format "</IMG>". Other markup languages have similar tags used to create hypertext documents.

Markup languages allow references to additional content besides text including graphics, animation, audio, video and other electronic data. For example, the Hyper Text Markup Language allows use of graphical images in a hypertext document with an image "<IMG>" tag. An exemplary Hyper Text Markup Language image tab <IMG SRC="logo.jpg"> allows a graphical logo image stored in a Joint Pictures Expert Group file "logo.jpg", to be displayed.

Hypertext documents from the World-Wide-Web are typically displayed for a user with a software application called a "browser" such as Internet Explorer, by Microsoft Corporation of Redmond Wash., Netscape Navigator, by Netscape Communications of Mountain View, Calif., and others. A browser typically parses a hypertext document and converts hypertext, including markup tags, into a visual display of text, graphics, animation, audio, video, etc., for display on a device such as a personal computer display.

Additional content is retrieved in a hypertext document from other sources using "hyperlink" references within hypertext documents. For example, an exemplary Hyper Text Markup Language hyperlink tag "<A HREF="http://www.spyglass.com/logo.mov">" provides a hyperlink to a movie file "logo.mov". When a user selects the link (e.g., with a mouse click) in a hypertext document, the movie file "logo.mov" is located using a Uniform Resource Locator ("URL") from the location "www.spyglass.com". Hyper Text Transfer Protocol (e.g., "HTTP") is used as the transfer protocol.

Transfer protocols such as Hyper Text Transfer Protocol ("HTTP"), File Transfer Protocol ("FTP"), Gopher, and others provide a means for transferring hypertext documents or additional content from other locations on the World-Wide-Web. Hyper Text Transfer Protocol is one primary protocol used to transfer information on the World-Wide-Web. Hyper Text Transfer Protocol is a protocol that allows users to connect to a server, make a hypertext request, get a response, and then disconnect from the server.

File Transfer protocol is a protocol that provides access to files on remote systems. Using File Transfer Protocol, a user logs onto a system, searches a directory structure and downloads or uploads a file. Gopher is a protocol similar to File Transfer Protocol. Gopher provides a series of menus linked to files containing actual hypertext.

Wireless devices, such as wireless phones, now have data capabilities in addition to voice capabilities. The data capabilities allow a wireless device to receive an electronic document from the World-Wide-Web. To optimize performance, and to provide an electronic document in a format useable on wireless devices, a Wireless Application Protocol ("WAP") is typically used. The Wireless Application Protocol includes several protocols and standards designed to provide wireless devices with access to an electronic document and was developed as an alternative to other markup languages and protocols developed for the World-Wide-Web. More information on the Wireless Application Protocol can be found on the World-Wide-Web at the URL "http://www.wapforum.org".

One component of the Wireless Application Protocol is a Wireless Markup Language ("WML"), which includes markup tags, and provides control over formatting and layout of an electronic document. The Wireless Markup Language is often more appropriate to use for wireless devices such as wireless phones than other markup languages such as Hyper Text markup Language.

Wireless Markup Language data is structured as a collection of "cards". A single collection of cards is referred to as a "deck". Each card includes structured content and navigation specifications. Logically, a user of a wireless device navigates through a series of cards, reviews the content of each card, enters requested information, selects options, and navigates to and from other cards in the deck.

Current Internet applications that provide information in HTML or WML form do not provide uniform user preferences as to linking of information. Users do not have a choice of options to force usability over different kinds of applications and extend the information in a way specific to the user. In some instances, excess user interaction is required in order to obtain information or obtain a service related to text in an HTML or WML document. For example, in order to translate a word in a document, a separate application must usually be involved.

SUMMARY OF THE INVENTION

The present invention provides a method and apparatus for user selectable automatic contact linking in Internet applications. In the method and apparatus, the usability of downloaded content may be modified for specific users by allowing a user to select and specify the context in which and how their content data is linked. Particular text may be selected and when content is downloaded from an origin service, including the particular, text, the text may be automatically linked to a service or database. The service or database may be independent of the origin service and may be provided by a third party.

In an embodiment of the invention, selected content may be linked inline or externally linked to an information retrieval database. For example, users may specify that all text including a company name or stock symbol be automatically externally linked to that company's stock information so that the user may click on the text and retrieve the information. Alternatively, the text, including a particular company name or stock symbol may be automatically linked inline to that company's stock information so that the information is displayed along with the text to the user. As another example, all proper names may be inline linked or externally linked to a telephone or address database.

In another embodiment of the invention, selected content may be linked to a service application. For example, a user may specify that each word of the text in a document be linked to a translation service to translate the document into a particular language.

BRIEF DESCRIPTION OF THE FIGURES

FIGS. 5a-5c illustrate original, inline and externally linked content according to one embodiment of the invention;

FIGS. 6a and 6b illustrate original content and externally linked content according to an alternative embodiment of the invention; and FIGS. 7a and 7b illustrate original content and externally linked content according to another alternative embodiment of the invention.

DETAILED DESCRIPTION OF THE INVENTION

Figure 1:
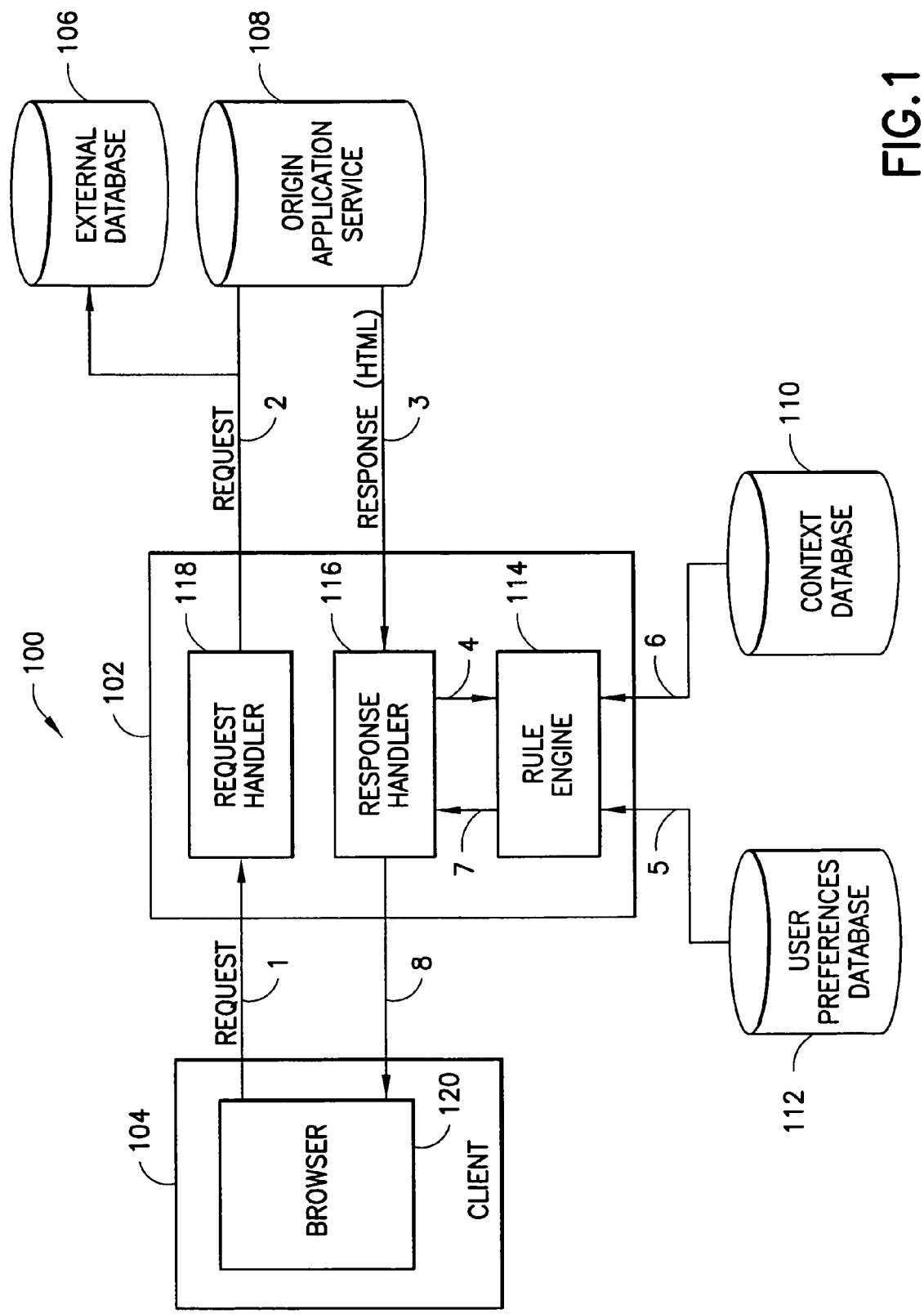
FIG. 1 is a client server model of portions of a system including a proxy server implementation of an embodiment of the invention.
Figure 2:
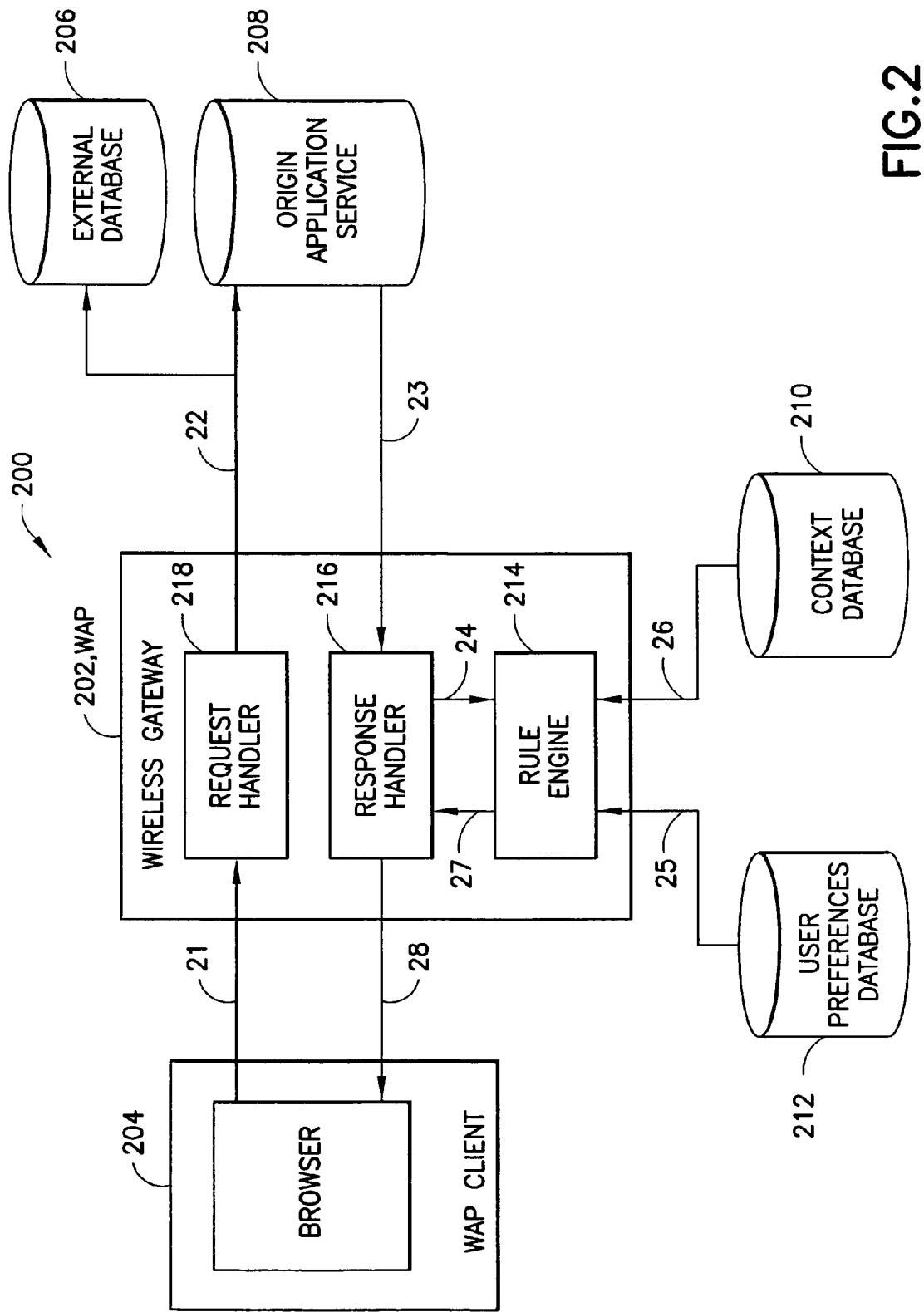
FIG. 2 is a client server model of portions of a system including a Wireless Gateway implementation of an embodiment of the invention.

Referring now to FIG. 1, therein is a client server of portions of a system 100 including a proxy server implementation of an embodiment of the invention. System 100 includes proxy server 102, client 104, external database 106, and origin application server 108. Proxy server 102 includes request handler 118, response handler 116, rule engine 114, user preference database 112 and context database 110. Client 104 includes a browser function 120. FIG. 2 illustrates an embodiment of the invention in which the method and apparatus is implemented in proxy server 102.

Figure 4:
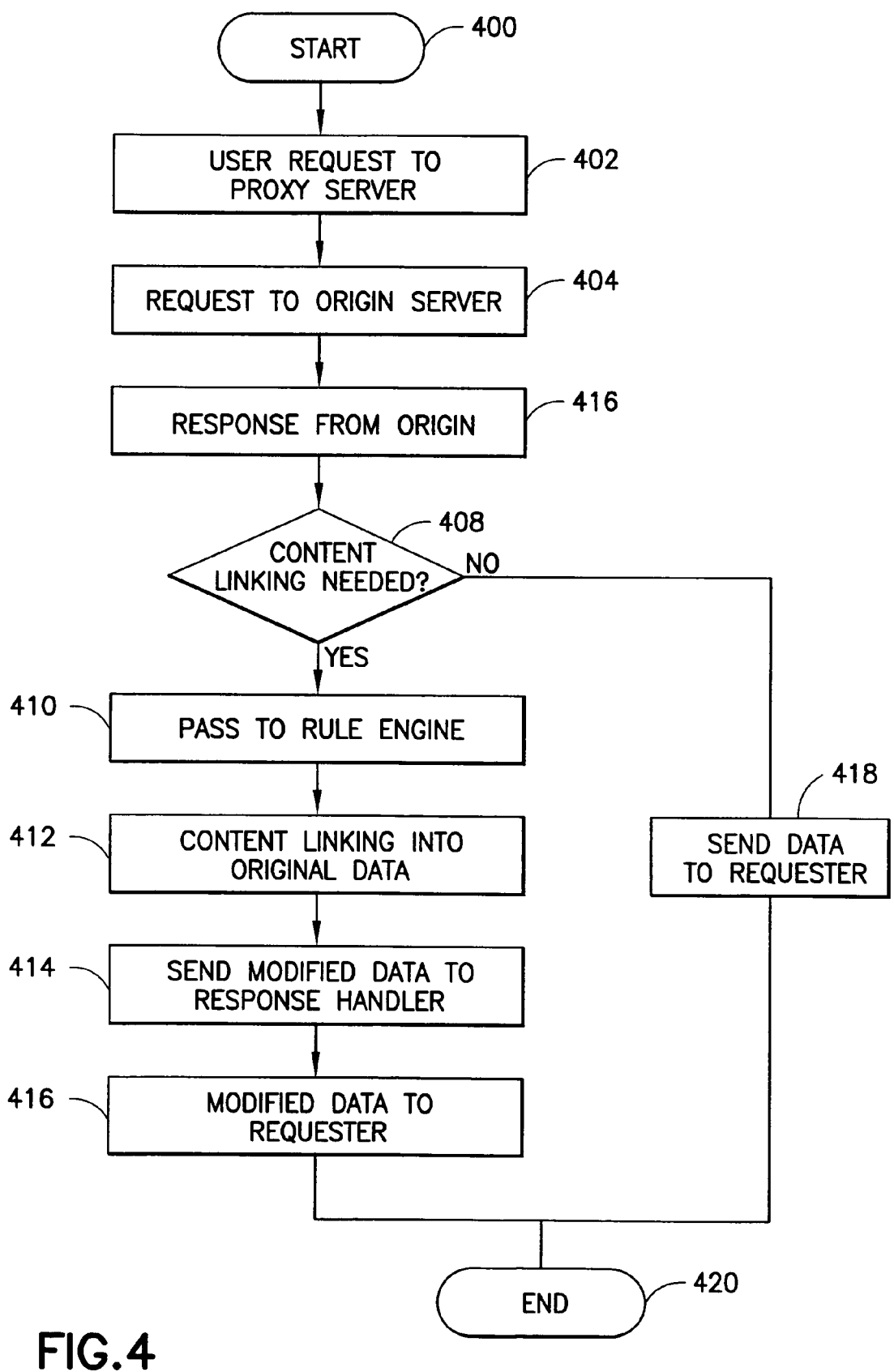
FIG. 4 is a flow diagram of process steps performed according to an embodiment of the invention.

Referring now to FIG. 4, therein is a flow chart showing process steps performed in system 100 according to the embodiment of the invention. The process begins (step 400) at step 402 where a request 1 to obtain data is generated to Server 102 in client 104. Client 104 may be a computer, such as a personal computer, that has client software installed as browser 120, that generates a request 1 that allows a user to request access to an Internet URL address. The request 1 is received in request handler 118 of server 102. Request handler 118 then sends a request 2 to the origin application service 108 that hosts the requested URL page at step 404. Next, at step 406, a response including a hyper text markup language (HTML) web page is returned to response handler 116 of server 102. Next, at step 408, response handler 116 determines if the user based preference linking of the embodiment is to be invoked to process the response including the retrieved HTML web page. In the process of the embodiment, after determining that the user based preference linking is to be involved at step 410, response handler 116 passes the response 4 to rule engine 114. Next, at step 412, rule engine 114 functions according to the embodiment to modify the response by checking the HTML web page and adding linking content or modifying linking content according to preferences of the user. In step 414, the rule engine 114 sends the modified data 7 to the response handler 116. In step 416, the response handler sends the modified data 8 to the browser 120. If content linking is not needed (step 408=NO), data 8 is sent to the requester in step 418. The method ends in step 420.

Rule engine 114 includes functionality that operates according to user defined preferences. Those preferences may be defined by a user, for example through use of a home page and password provided by the provider of the user based preference linking service. The user may enter data through the home page that is processed by server 102 to configure rule engine 114 functionality for the particular user. The user preferences and context in which rule engine 114 modifies an HTML web page may be stored in user preference database 112 and context database 110 and accessed via 5 and 6, respectively. Alternatively, rule engine 114 could be configured by other methods, for example by the service provider itself.

The functionality of rule engine 114 may be defined, for example, to modify the response so that data retrieval or a service may be invoked for particular words or phrases included in the HTML web page of the response 3 sent from origin application service 108. For example, names of a particular company or companies included in response 3 may be linked to financial data so that financial data is automatically displayed with the name in the modified HTML web page. Alternatively, a company name may be displayed with a hyper link, which allows the user to click on and display company data through the modified HTML web page.

FIGS. 5a, 5b, and 5c illustrate original content, inline linked content and externally linked content, respectively, according to an embodiment of the invention. In FIG. 5a, the original content as it would appear in an HTML web page retrieved in request 3 from origin application server 108 is shown. FIG. 5b shows the same content of FIG. 5a as it would appear after the HTML web page is modified by rule engine 114 according to one embodiment of the invention. In FIG. 5b, inline financial content has been linked to the text "Nok" appearing in the original content. FIG. 5c shows the original content of FIG. 5a as it would appear after the HTML web page is modified by rule engine 114 according to another embodiment of the invention. In FIG. 5c, financial content has been externally linked to the text "Nok" appearing in the original content.

FIGS. 6a and 6b illustrate original content and externally linked content, respectively, according to an alternative embodiment of the invention. FIG. 6b shows the original text "John Smith" externally linked to a user information page. The embodiment of FIG. 6b may be most useful, for example for a company intranet page.

FIGS. 7a and 7b illustrate original content and externally linked content, respectively, according to another alternative embodiment of the invention. FIG. 7b shows that all Finnish language text in the page has been externally linked to a translation database for translation into English.

Rule engine 114 may be configured to function according to user preferences using various programs and programming tools to modify and make decisions about how to modify the HTML web page.

Referring now to FIG. 2, therein is a client server model of portions of a system including a wireless gateway implementation of an embodiment of the invention. System 200 functions in a manner similar to system 100 of FIG. 1 with the exception that the WAP client 204 is a wireless device with request 21 and response 28 being sent over the air interface, and rule engine 214 functions by working on a wireless markup language (WML) version of a web page that is obtained from origin application server 208, included in response 23 processed in response handler 216, and then sent 24 to rule engine 214 for processing. In the embodiment of FIG. 2, a modified version 27 of the WML web page is created in rule engine 214 and sent to client 204 as response 28. The rule engine 214 is coupled to the user preferences database 212 and context database via 25 and 26, respectively.

Figure 3:
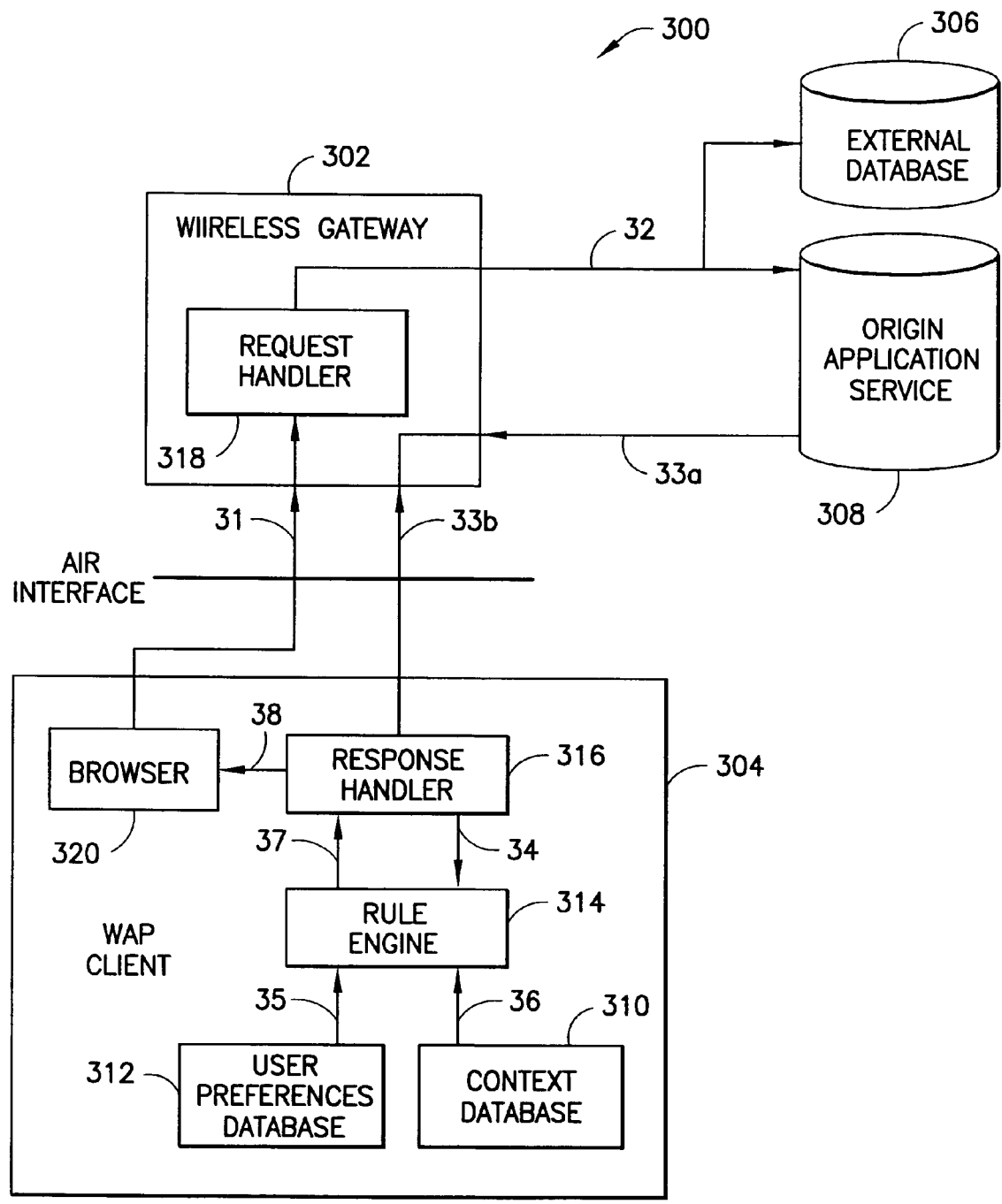
FIG. 3 is a client server made of portions of a system including a client based implementation of an embodiment of the invention.

Referring now to FIG. 3, therein is a client server model of portions of a system including a client-based implementation of an embodiment of the invention. System 300 functions in a similar manner to the embodiment of FIG. 2, with the difference being that the functionality of response handler 216, rule engine 214, user preferences database 212 and content context database 210 are implemented in ha WAP client 304. In FIG. 3, the contents of the user preferences database 312 and the context database 310 may be implemented in permanent memory or removable modules within the WAP client 304. Requests 31, 32 are communicated through the request handler 318 of the wireless gateway 302 to the external database 306 and the origin application service 308. Responses 33a are communicated from the origin application service 308 to the wireless gateway 302, which communicates the responses 33b to the response handler 316 of the WAP client 304. The response handler 316 communicates responses 34 to the rule engine 314, which is coupled 35, 36, respectively, to the user preferences database 312 and the context database 310. The rule engine 314 communicates modified data 37 to the response handler 316, which then communicates the response 38 to the browser 320.

In the embodiments of FIGS. 1, 2 and 3, the method and apparatus may be implemented as more than one computer program. The programs are used where software applications retrieve data in response to a users request, perform some type of processing on the retrieval data and format the data that is to be returned to the user for display. According to the embodiment, one program will be responsible for data modification and formatting according to the invention. Preferably, the programs are implemented as stand alone code, whereby one program implements only data retrieved and another implements data modification. Alternatively, the data retrieval and equivalently, the data modification and formatting may be implemented as one or more modules (code subroutines or objects) which are incorporated along with other modules to form complete programs, where the data retrieval is isolated to one-or-more modules. As shown in FIGS. 1, 2 and 3, the programs will typically execute on a computer functioning as a server, or a wireless gateway or at a client, providing services in response to requests from a client using a Web browser connected to the Internet. Alternatively, the connection may be to a corporate intranet of which the client is a component, where this corporate intranet provides service in a similar manner to the Internet. Use of the term "Internet", herein, when discussing processing associated with the users request, includes processing that occurs in the intranet. While the embodiments contemplate that the data retrieval is implemented in a different program from the data modification and formatting, the two different functions may be implemented in a single program without deviating from the scope of the present invention.

The method and apparatus of the invention has application to any system and configuration of a system providing text and Internet type services. For example, while the embodiment has been shown using HTML and WML text, the method and apparatus may be applied to use of any markup language, including next generation markup languages such as Extensible Hypertext Markup Language (XHTML). Thus, although the method and apparatus of the present invention has been illustrated and described with regard to presently preferred embodiments thereof, it will be understood that numerous modifications and substitutions may be made to the embodiments described, and that numerous other embodiments of the invention may be implemented without departing from the spirit and scope of the invention as defined in the following claims

What is claimed is:

1. An apparatus comprising:
   at least one processor; and
   at least one memory including computer program code,
   the at least one memory and the computer program code configured to, with the at least one processor, cause the apparatus to perform at least the following:
   receive one or more inputs of one user;
   convert the one or more inputs into at least one user-defined text-based linking rule based upon semantic content preferences of the user;
   when content becomes available as specified in the at least one user-defined text-based linking rule, process the content of a web page to be displayed at a user interface for the user, the web page including information for formatting the content that includes one or more words, and
   determine to modify the web page in accordance with the at least one user-defined text-based linking rule that adds at least one link to external content for at least one of the words displayed in the web page at the user interface, wherein the at least one word remains in a modified web page with an identical text as in the web page, and the at least one link is embedded in the at least one word only in the modified web page.

2. The apparatus of claim 1, wherein the apparatus is further caused to:
   determine to display the modified web page at the user interface showing the at least one portion embedded with the at least one link.

3. The apparatus of claim 2, wherein the web page and the modified web page are in a common visual representation format that displays the content in an identical manner except embedding the at least one link in the at least one word in the modified web page.

4. The apparatus of claim 3, wherein the user-defined text-based linking rule adds the at least one link to each of a plurality of occurrences of the at least one word in the webpage, and displays in the modified web page each occurrence of the at least one word embedded with the at least one link.

5. The apparatus of claim 2, wherein the web page and the modified web page display the at least one word at an identical position with an identical format except embedding the at least one link in the at least one word and underlining the at least one word in the modified web page.

6. The apparatus of claim 5, wherein the user-defined text-based linking rule adds the at least one link to each occurrence of the at least one word in the webpage and displays in the modified web page each occurrence of the at least one word with an underline.

7. The apparatus of claim 6, wherein the user-defined text-based linking rule links one or more human names, one or more company names, one or more stock symbols, or a combination thereof, to one or more phone numbers, one or more addresses, one or more webpages, or a combination thereof.

8. The apparatus of claim 1, wherein the apparatus is further caused to:
determine to configure a rule engine to set one or more pre-defined rules including the at least one user-defined text-based linking rule.

9. The apparatus of claim 8, where in the at least one user-defined text-based linking rule specifies in which context the portion of the content is linked, and specifies the at least one link to an external application associated with the external content.

10. The apparatus of claim 9, wherein the external content, or the external application is associated with a service.

11. The apparatus of claim 8, wherein the web page is modified in accordance with the one or more pre-defined rules without user intervention.

12. The apparatus of claim 8, wherein the rule engine is further caused to:
determine to configure the at least one user-defined text-based linking rule based upon the semantic content preferences of the user.

13. The apparatus of claim 1, wherein at least a portion of the content includes text in a first spoken language, and the at least one link is associated with an external translation database, an external translation service, or a combination thereof to obtain a translation of the text in a second spoken language.

14. The apparatus of claim 1, wherein the web page comprises a hypertext markup language page, or a wireless markup language page.

15. The apparatus of claim 1, wherein the apparatus is within either a server, a proxy server, a client device, a wireless application protocol client device, or a wireless gateway.

16. A method comprising:
receiving by an apparatus one or more inputs of one user;
converting by the apparatus the one or more inputs into at least one user-defined text-based linking rule based upon semantic content preferences of the user;
when content becomes available as specified in the at least one user-defined text-based linking rule, processing by the apparatus the content of a web page to be displayed at a user interface for the user, the web page including information for formatting the content that includes one or more words, and
determining by the apparatus to modify the web page in accordance with the at least one user-defined text-based linking rule that adds at least one link to external content for at least one of the words displayed in the web page at the user interface, wherein the at least one word remains in a modified web page with an identical text as in the web page, and the at least one link is embedded in the at least one word only in the modified web page.

17. The method of claim 16, further comprising:
determining to display the modified web page at the user interface showing the at least one portion embedded with the at least one link.

18. The method of claim 16, further comprising:
determining to configure a rule engine to set one or more pre-defined rules including the at least one user-defined text-based linking rule.

19. The method of claim 18, wherein the at least one user-defined text-based linking rule specifies in which context the portion of the content is linked, and specifies the at least one link to an external application associated with the external content.

20. The method of claim 19, wherein the external content, or the external application is associated with a service.

21. The method of claim 18, wherein the web page is modified in accordance with the one or more pre-defined rules without user intervention.

22. The method of claim 18, wherein the rule engine is further caused to determine to configure the at least one user-defined text-based linking rule based upon the semantic content preferences of the user.

23. The method of claim 16, wherein at least a portion of the content includes text in a first spoken language, and the at least one link is associated with an external translation database, an external translation service, or a combination thereof to obtain a translation of the text in a second spoken language.

24. The method of claim 16, wherein the web page comprises a hypertext markup language page, or a wireless markup language page.

25. A method comprising facilitating a processing of and/or processing (1) data and/or (2) information and/or (3) at least one signal, the (1) data and/or (2) information and/or (3) at least one signal based, at least in part, on the following:
receiving by an apparatus one or more inputs of one user;
at least one determination by the apparatus to convert the one or more inputs into at least one user-defined text-based linking rule based upon semantic content preferences of the user;
when content becomes available as specified in the at least one user-defined text-based linking rule, at least one determination by the apparatus to process the content of a web page to be displayed at a user interface for the user, the web page including information for formatting the content that includes one or more words; and
at least one determination by the apparatus to modify the web page in accordance with the at least one user-defined text-based linking rule that adds at least one link to external content for at least one of the words displayed in the web page at the user interface, wherein the at least one word remains in a modified web page with an identical text as in the web page, and the at least one link is embedded in the at least one word only in the modified web page.

26. The method of claim 25, wherein the (1) data and/or (2) information and/or (3) at least one signal are further based, at least in part, on the following:
at least one determination by the apparatus to display the modified web page at the user interface showing at least one portion embedded with the at least one link.

27. The method of claim 25, wherein the (1) data and/or (2) information and/or (3) at least one signal are further based, at least in part, on the following:
at least one determination by the apparatus to configure a rule engine to set one or more pre-defined rules including the at least one user-defined text-based linking rule.

28. The method of claim 27, wherein the at least one user-defined text-based linking rule specifies in which context a portion of the content is linked, and specifies the at least one link to an external application associated with the external content.

29. The method of claim 28, wherein the external content, or the external application is associated with a service.

30. A non-transitory computer-readable storage medium carrying one or more sequences of one or more instructions which, when executed by one or more processors, cause an apparatus to at least perform the following steps:

receiving one or more inputs of one user;

converting the one or more inputs into at least one user-defined text-based linking rule based upon semantic content preferences of the user;

when content becomes available as specified in the at least one user-defined text-based linking rule, processing the content of a web page to be displayed at a user interface for the user, the web page including information for formatting the content that includes one or more words, and determining to modify the web page in accordance with the at least one user-defined text-based linking rule that adds at least one link to external content for at least one of the words displayed in the web page at the user interface, wherein the at least one word remains in a modified web page with an identical text as in the web page, and the at least one link is embedded in the at least one word only in the modified web page.

31. The non-transitory computer-readable storage medium of claim 30, wherein the apparatus is caused to further perform:

determining to display the modified web page at the user interface showing at least one portion embedded with the at least one link.

\* \* \* \* \*